US006415435B1

United States Patent
McIntyre

(10) Patent No.: US 6,415,435 B1
(45) Date of Patent: Jul. 2, 2002

(54) METHOD AND APPARATUS FOR DETERMINING COMPATIBILITY OF PARENT CLASSES IN AN OBJECT ORIENTED ENVIRONMENT USING VERSIONING

(75) Inventor: Joseph Herbert McIntyre, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/271,491

(22) Filed: Mar. 18, 1999

(51) Int. Cl.⁷ .............................................. G06F 9/445
(52) U.S. Cl. ...................... 717/108; 717/170; 707/103
(58) Field of Search ................ 717/11, 170, 1, 717/122, 3, 165, 10, 108, 2; 707/103

(56) References Cited

U.S. PATENT DOCUMENTS

| | | | | |
|---|---|---|---|---|
| 5,404,525 A | | 4/1995 | Endicott et al. | 395/700 |
| 5,535,389 A | | 7/1996 | Elder et al. | 395/700 |
| 5,574,898 A | * | 11/1996 | Leblang et al. | 707/1 |
| 5,890,176 A | * | 3/1999 | Kish et al. | 707/511 |
| 6,141,795 A | * | 10/2000 | Laugner | 717/170 |
| 6,175,855 B1 | * | 1/2001 | Reich et al. | 709/202 |
| 6,182,286 B1 | * | 1/2001 | Sigal et al. | 717/122 |
| 6,209,128 B1 | * | 3/2001 | Gerard et al. | 717/11 |
| 6,216,140 B1 | * | 4/2001 | Kramer | 707/10 |
| 6,289,509 B1 | * | 9/2001 | Kryloff | 717/170 |
| 6,289,510 B1 | * | 9/2001 | Nakajima | 717/170 |

FOREIGN PATENT DOCUMENTS

EP    0 546 682 A2 *  6/1993  ............. G06F/9/44

OTHER PUBLICATIONS

Chawathe et al., "Change Detection in Hierachically Structured Information", ACM, pp. 493–504, Jun. 1996.*
Forman et al., "Release–to–Release Binary Compatibility in SOM", ACM, pp. 426–438, Oct. 1995.*

* cited by examiner

Primary Examiner—Kakali Chaki
Assistant Examiner—Ted T. Vo
(74) Attorney, Agent, or Firm—Duke W. Yee; David A. Mims, Jr.; Betty G. Formby

(57) ABSTRACT

A method and apparatus in a computer for comparing version information contained within class definitions to determine compatibility between classes in a hierarchy within an object oriented system.

Version information is collected from the class being instantiated and its parent class. This information includes current version, compatible versions, and the version requirements of the class of its parent class. The required version is used to determine compatibility with the parent class. The runtime system utilizes this collection of information from both class definitions, analyzes the version relationship and determines the course of action to take based on this analysis.

40 Claims, 4 Drawing Sheets

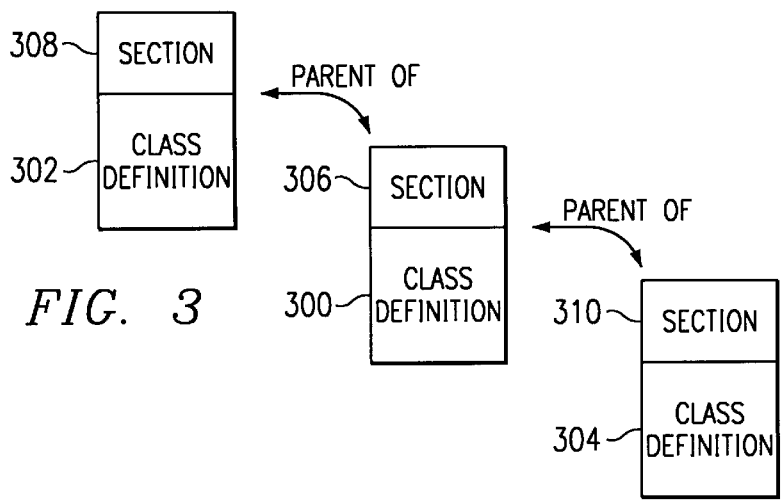

FIG. 2

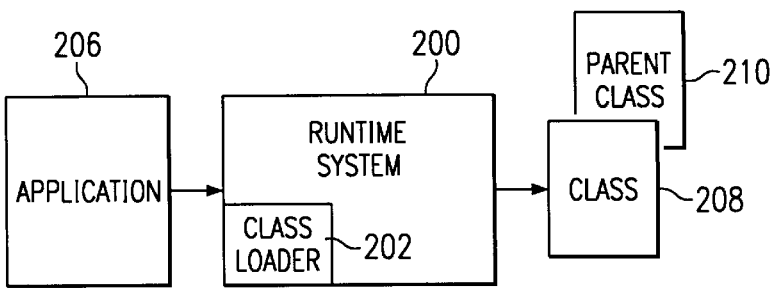

FIG. 3

```
{                                                               400
    public static final long interfaceVersion=5;  402
    public static final long implementationVersion=6;  404
    public static final long parentInterfaceRequired=2;  406
    public static final long parentImplementationRequired=3;  408
    public static final long compatibleInterfaces[]={1,2,3,4};
    public static final long compatibleImplementations[]={2,4,5};
}                                                               410
```

FIG. 4

```
{                                                               500
    public static final long interfaceVersion=2;  502
    public static final long implementationVersion=4;  504
    public static final long parentInterfaceRequired=1;  506
    public static final long parentImplementationRequired=2;
    public static final long compatibleInterfaces[]={1};  508
    public static final long compatibleImplementations[]={1,2};
}                                                               510
```

FIG. 5

```
}
                                600
    public static final long  interfaceVersion=1;         602
    public static final long  implementationVersion=1;    604
    public static final long  parentInterfaceRequired=1;  606
    public static final long  parentImplementationRequired=3;
    public static final long  compatibleInterfaces[]={ };   608
    public static final long  compatibleImplementations[]={ };
}
                                                         610
```
*FIG. 6*
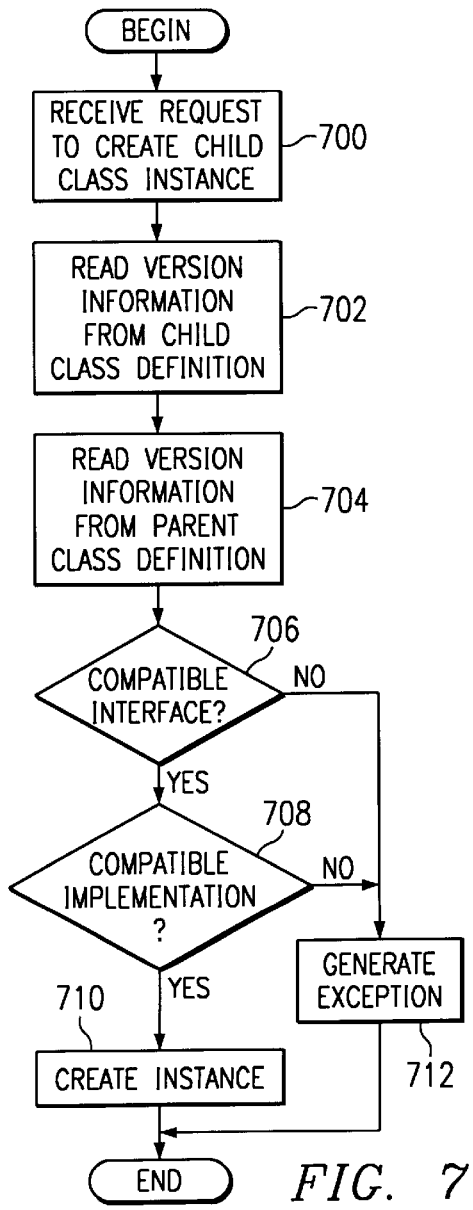
*FIG. 7*
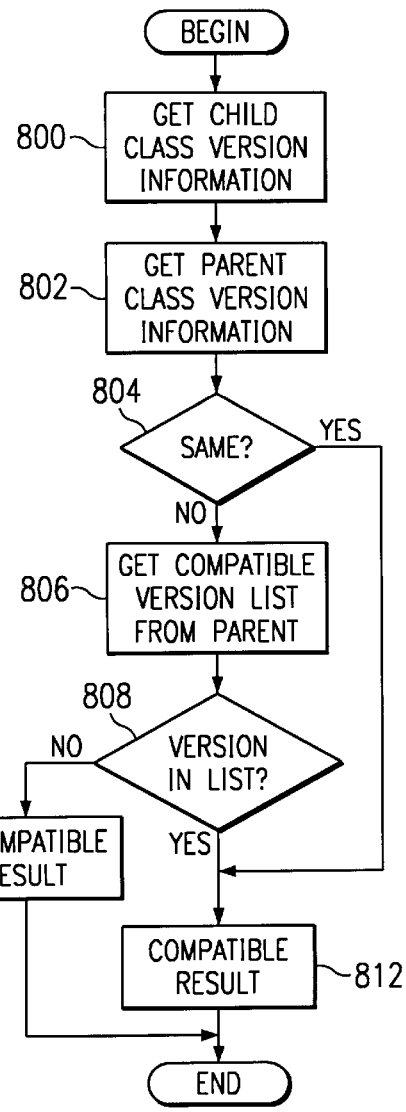
*FIG. 8*

```
interface A : SOMObject
{
        implementation
        {
                version = 5;         1000
                compatibleversion = 3, 4;    1002 parentversion: SOMObject, 12;    1004
        }
};

interface B: A, C
{
        implementation
        {
                version = 7;         1006
                compatibleversion: 4, 5;    1008 parentversion: A, 3;    1010
                parentversion: C, 2;
        };
};
```

METHOD AND APPARATUS FOR DETERMINING COMPATIBILITY OF PARENT CLASSES IN AN OBJECT ORIENTED ENVIRONMENT USING VERSIONING

BACKGROUND OF THE INVENTION

1. Technical Field

The present invention relates generally to an improved data processing system and in particular to a method and apparatus for determining compatibility of different classes in a data processing system. Still more particularly, the present invention provides a method and apparatus for versioning and identfying compatibility between classes in a object oriented hierarchy.

2. Description of Related Art

With the rapid developments occurring in the software industry, a current version of a program may be current only for a short period of time with minor and major improvements occurring often. A "version" is a particular issue or release of a computer program, module or class. A "version number" is a number assigned by a software developer to identify a particular program. at a particular stage, before and after public release. Successive releases of a program are assigned increasingly higher numbers, such as version 1, version 2, and version 3. Many improvements to software occur so rapidly that the distribution of these improvements are made through web sites on the Internet, rather than by mail or at a store.

Changes in individual components that interact with each other in a computer program also may occur. Sometimes different groups or companies may provide updates to different components. The changes to these components also may be distributed to users through various channels. With such distribution of components, managing compatibility between versions is a desirable feature in a system in which objects or components interact within other components, but in which not all of the objects or components are changed at the same time. With object oriented environments, a parent class of a child class may chance over time and the parent class may be supplied by a company different from that of the child class. The current version systems available do not take into account the fact that while a class may change over time that backwards compatibility to previous classes may be maintained.

Therefore, it would be desirable to have an improved method and apparatus for managing compatibility between different versions of interacting components, especially between child and parent classes.

SUMMARY OF THE INVENTION

The present invention provides a method and apparatus in a computer for comparing version information contained within class definitions to determine compatibility between classes in a hierarchy within an object oriented system.

Version information is collected from the class being instantiated and its parent class. This information includes current version, compatible versions, and the version requirements that the class defines for its parent class. The required version is used to determine compatibility with the parent class. The runtime system utilizes this collection of information from both class definitions, analyzes the version relationship and determines the course of action to take based on this analysis.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a block diagram of components used to create a new class instance in accordance with a preferred embodiment of the present invention within any object oriented runtime system;

FIG. 3 is a block diagram illustrating data structures containing versioning information in accordance with a preferred embodiment of the present invention;

FIG. 4 an illustration of versioning information located within a parent class definition in accordance with a preferred embodiment of the present invention;

FIG. 5 is an illustration of versioning information located within a child class definition showing compatibility in accordance with a preferred embodiment of the present invention;

FIG. 6 is an illustration of versioning information located within a child class definition showing incompatibility in accordance with a preferred embodiment of the present invention;

FIG. 7 is a flowchart of a process illustrating the use of a versioned class in which a child class and a parent class is present in accordance with a preferred embodiment of the present invention;

FIG. 8 is a flowchart of a process for checking compatibility between an interface and an implementation in accordance with a preferred embodiment of the present invention;

DETAILED DESCRIPTION OF THE PREFERRED EMBODIMENT

Figure 1:
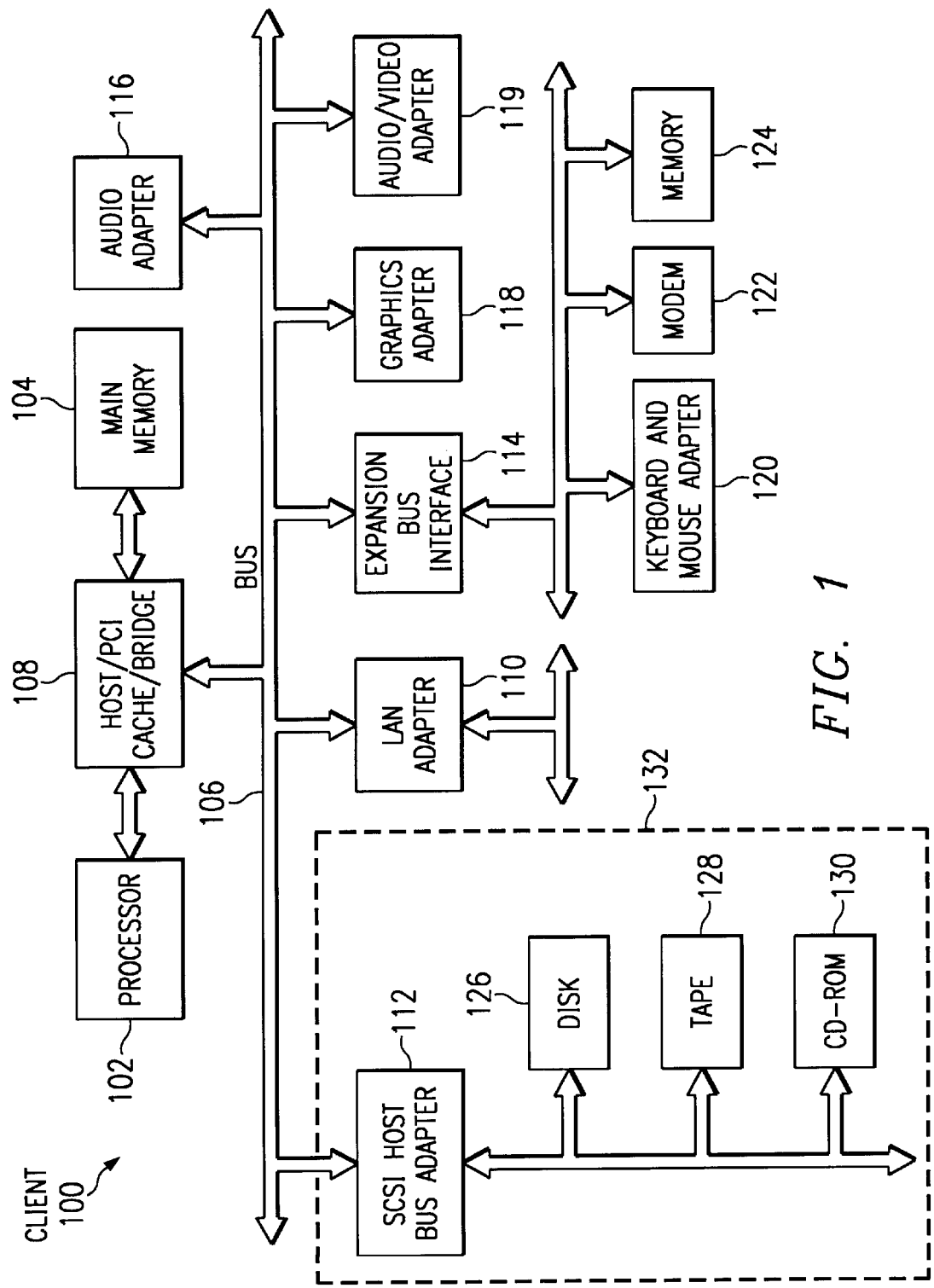
FIG. 1 is a block diagram illustrating a data processing system in which the present invention may be implemented.

With reference to the figures and in particular with reference to FIG. 1, a block diagram illustrates a data processing system in which the present invention may be implemented. Data processing system 100 is an example of a client computer. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection For a keyboard and mouse adapter 120, modem 122, and additional memory 124. SCSI host bus adapter 112 provides a connection for hard disk drive 126, tape drive 128, and CD-ROM drive 130.

Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 100. "Java" is a trademark of Sun Microsystems, Inc. Instructions for the operating system, the object-oriented operating system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 1. Also, the processes of the present invention may be applied to a multiprocessor data processing system.

For example, data processing system 100, if optionally configured as a network computer, may not include SCSI host bus adapter 112, hard disk drive 126, tape drive 128, and CD-ROM 130, as noted by dotted line 132 in FIG. 1 denoting optional inclusion. in that case, the computer, to be properly called a client computer, must include some type of network communication interface, such as LAN adapter 110, modem 122, or the like. As another example, data processing system 100 may be a stand-alone system configured to be bootable without relying on some type of network communication interface, whether or not data processing system 100 comprises some type of network communication interface. As a further example, data processing system 100 may be a Personal Digital Assistant (PDA) device which is configured with ROM and/or flash ROM in order to provide non-volatile memory for storing operating system files and/or user-generated data.

The depicted computer in FIG. 1 and above-described examples are not meant to imply architectural limitations as to the data processing system in which the present invention may be implemented.

The present invention provides a method, apparatus, and instructions for providing versioning and checking versioning of different components in a software application or program. A component containing version information includes an identification of the current version of the components along with a list of- versions to which the component is backward compatible. For example, if a first component requires a particular version of a second component and version of the required component is not the required version, a number of other versions of the second component compatible to the current version of the second component may be made to see if the first component is compatible with the second component. This mechanism is useful because not all prior versions of a component are necessarily compatible with a newer version. The mechanism of the present invention allows a component to include information identifying versions with which the component is backward compatible. Further, the mechanism of the present invention allows for comparing versions of different classes to identify whether they are compatible with each other. Also, included are definitions of parent classes that are required for version compatibility.

A component may be associated with other components in which the components communicate with each other to perform one or more tasks. In object oriented environments, the class or classes for the component or interrelated components may be replaced with more current or improved versions over time. Such replacements do not always result in the replacement of all of the classes, but often times only one or a few of the classes might be replaced.

Java is the environment in which the depicted examples are presented. Such examples, however, are not intended as limitations to the application of the method, apparatus, and instructions of the present invention to a particular environment or programming language. Java™ is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods.

The Java virtual machine (JVM) is a virtual computer component that resides only in memory. The JVM allows Java programs to be executed on different platforms as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format —the compiled code is executable on many processors, given the presence of the Java run time system. The Java compiler generates bytecode instructions that are non-specific to particular computer architectures. A bytecode is a machine independent code generated by the Java compiler and executed by a Java interpreter. A Java interpreter is a module in the JVM that alternatively translates and executes a bytecode or bytecodes. These bytecode instructions are designed to be easy to interpret on any machine and easily translated on the fly into native machine code.

With reference now to FIG. 2, a block diagram of components used to create a new class instance is depicted in accordance with a preferred embodiment of the present invention within any object oriented runtime system. In the depicted example, Runtime System 200 includes a class loader 202. Runtime System 200 will receive a request from Application 206 to create an instance of a class. If this is the first instance of this class to be created, the Runtime System will execute the version checking mechanism to determine the compatibility of the class to be created with its hierarchy of parent classes.

In the depicted example, class loader 202 is responsible for loading new classes into the runtime environment. Given information about what class to load, the class loader will retrieve the class data from a data storage medium for the class and recursively for each of the classes parent classes until the root class is reached. A class is defined by a class declaration which specifies the properties of a class, according to the particular technology definition, which may include modifiers, class name, super classes, and interfaces.

In accordance with a preferred embodiment of the present invention, the class declaration also may include the versioning information used by the processes of the present Invention.

As a result of the request for creation of a new instance of class 208, the class loader operation may produce an instance of the class 208 and its parent class 210. Where the class hierarchy for class 208 exceeds one level or where class 208 has multiple parents, the resulting diagram would contain multiple of parent class 210, one for each parent element of the hierarchy.

With reference now to FIG. 3, a block diagram illustrating data structures containing versioning information is depicted in accordance with a preferred embodiment of the present invention. In this example, the data structures are class definitions used in defining classes used in Java. Class definition 300 has a parent class 302. Class definition 300 is a parent class to class definition 304. The versioning information for class 300 is contained within section 306. Class definition 302 has its versioning information contained within section 308 while class definition 304 has its class information contained within section 310. These class definitions are used at one time to create new instances of a class. in the depicted examples, if a request to create a new instance of a class falling under class definition 300 is received, then version information from section 306 in class 300 is compared to version information in section 308 of class 302 to determine whether compatibility is present. If a request is made to create an instance of a class using class definition 304, then class information from section 310 is compared with class information from section 306. A recursive comparison is made to ensure compatibility occurs upwards by also making a comparison of the class information in section 306 for class Definition 300 with the class information from section 308 for class definition 302. In this example, class definition 302 represents the information for the root parent class because class definition 302 has no parent. Of course, versioning information may be placed in association with other objects for other types of environments.

FIGS. 4, 5, and 6 show a set of class definitions. These class definitions follow the preferred embodiment of the present invention when implemented using Java. These three figures show a parent class FIG. 4, a compatible child class FIG. 5 and an incompatible child class FIG. 6. These class definitions are representative of common application scenarios.

These class definitions are common to class changes that extend existing function or improve the implementation of the class. The interface of the parent class FIG. 4 is compatible with all prior interfaces, but the implementation shows that two prior implementations were not compatible, probably due to the introduction of a defect or side effect in these versions. These changes could reflect work on year 2000 compatibility issues, where the original implementation was not year 2000 compliant and version 3 of the implementation introduced a bug that created an unexpected side effect. A class that used this class as a parent would specify the required version as one that implemented the year 2000 compatible changes, and the runtime system will notify the application if a non-year 2000 compatible version of the parent class is present.

With reference now to FIG. 4, an illustration of versioning information located within a class definition is depicted in accordance with a preferred embodiment of the present invention using Java. In FIG. 4, the version information in the class example includes a declaration public indicating that the method for these class definitions is public and is accessible to all classes regardless of their lineage or package. No restrictions are present with respect to this versioning information.

The version information is defined within the class definition using standard Java syntax for defining constant values, that is using static final modifiers in the definition of a variable to ensure that it has a value that cannot be changed at runtime. This example shows the use of a long integer as the data type and uses progressive numbering for version.

In the declaration, interfaceVersion 400 provides a version identifier for the interface for the particular class. In this example, the version identifier is a version number 5. The interface is the mechanism that a class uses to communicate with other classes. The interface version is the version of the interface used to communicate with other classes. An implementation is the code actually used by the class. The implementation version is the version of the code used by the class. Next, implementationVersion 402 is a version identifier used to indicate the version of the implementation, which is 6 in this case. In the class declaration, parentInterfaceRequired 404 is a version identifier, which indicates the interface version required in the parent class from which this class is a child. In this example, parentInterfaceRequired 404 is equal to 2. Next, parentImplementationRequired 406 is a version identifier, indicating the version of the implementation required for the parent class. The version identifier is equal to a 3 for parentImplementationRequired 406.

In the class declaration, compatibleInterfaces [ ] 408 indicates the interface version with which the interface in the class definition is compatible. In the depicted example, the interface version list includes 1, 2, 3, 4. Although in this example compatibleInterfaces [ ] 408 includes compatible versions, a class definition with no compatible versions may be indicated by defining an empty set (zero length array as shown in FIG. 6). Next, compatibleImplementations [ ] 410 is a list of identifiers used to indicate the version or versions of the implementation with which this class is compatible. In the class declaration, the compatibleInterfaces [ ] 408 and compatibleImplementations [ ] 410 statements are used to identify backward compatibility. In accordance with a preferred embodiment of the present invention, interfaceVersion 400 and impementationVersion 402 indicate the current version of the class while parentInterfaceRequired 404 and parentImplementationRequired 406 indicate the requirements for the parent class with which this class is to be used. The backward compatibility provided by these class declarations allows for another class requesting this class to identify whether compatibility is present even though the parent versions may not be those required by the class. In this example, the class example has an interface version of 5 and an implementation version of 6. The interface required for example parent is version 2 while the implementation required for example parent is version 3.

With respect to backward compatibility, the following example is useful to illustrate the mechanism of the present invention.

With reference to FIG. 5, a diagram of class declarations for a class is depicted in accordance with a preferred embodiment of the present invention. This example shows a compatible child class, where the runtime system will determine that the version information in this class definition is compatible with the parent class defined in FIG. 4. This class has an interface version, interfaceVersion 500, of 2 and an implementation version, implementationVersion 502, of 4.

The required parent interface version, parentInterfaceRequired 504, is 1 while the required parent implementation version, parentImplementationRequired 506, is 2. The compatible interfaces, compatibleInterfaces [ ] 508, of the class child example is 1 while the compatible implementations, compatibleImplementations [ ] 510, of class child example are 1 and 2. Upon receiving a request for creation of the class depicted in FIG. 5 as a child of the class depicted in FIG. 4, the version information from the class in FIG. 5 is compared with version information of the class in FIG. 4. In this example, the parentInterfaceRequired is version 1, which is included in the list of compatible interfaces in FIG. 4, and the parentImplementationRequired, 3, is included in the list of compatible implementations.

With reference to FIG. 6, a diagram of class definitions for a class is depicted in accordance with a preferred embodiment of the present invention. This class is an example of an incompatible child class to the parent illustrated in FIG. 4. This class has an interface version, interfaceVersion 600, of 1 and an implementation version, implementationVersion 602, of 1. The required parent interface version, parentInterfaceRequired 604, is 1 while the required parent implementation version, parentImplementationRequired 606, is 3. Since this is the first version of a class, the compatibleInterfaces[ ] 608 and compatibleImplementations [ ] 610 are both empty sets.

Since the parentImplementationRequired is defined as 3 and the parent class defined in FIG. 4 is not version 3, nor is version 3 listed in the compatibleImplementations list, this class is not compatible with the version of the parent class defined in FIG. 4. Such an implementation of versioning information may be used within a class definition with existing Java syntax. Each of the elements is defined as a static constant within the class definition, allowing the runtime or other classes to query the version information without having to create an instance of the class. No changes to Java language syntax or to class files are required to implement this versioning information and mechanism. Further, a runtime system or application that implements policies using this information does not require techniques not currently available in the current Java definition to extract the information.

With reference now to FIG. 7, a flowchart of a process illustrating the use of a versioned class in which a child class and a parent class are present and are implemented in accordance with a preferred embodiment of the present invention. The process in this flowchart may be implemented within an object oriented runtime system. In particular, this process may be implemented within the class loading mechanism to check versioning when a new class instance is to be created. The process begins by receiving a request for creation of a child class instance (step 700). Creation of the child class includes invoking the loader and handling the returned instance of the new class or exception.

Thereafter, version information is read from the child class definition (step 702). Version information is also read from the parent class definition (step 704). This version information may be found in class definition statements such as those illustrated in FIGS. 4, 5, and 6. A determination is then made as to whether a compatible interface is present (step 706). If a compatible interface is present, the process then determines whether a compatible implementation is present (step 708). If a compatible implementation is present, then the instance of the class is created (step 710) with the process terminating thereafter.

With reference again to (steps 706 and 708), if a compatible interface or implementation is not present, then an exception is generated (step 712).

With reference now to FIG. 8, a flowchart of a process for checking compatibility between an interface and an implementation is depicted in accordance with a preferred embodiment of the present invention. The process illustrated in FIG. 8 is a more detailed illustration of the determinations made in steps 706 and 708 in FIG. 7. The process begins by obtaining the class version information for the child class (step 800). Then, the parent version information is obtained for the parent class (step 802). A determination is made as to whether the class version for the child class is the same as the parent version (step 804). If the version is not the same, then a compatibility list is obtained from the parent class (step 806). A determination then is made as to whether the version for the child class is in the version list obtained from the parent class (step 808). If the version is not within the list, then an incompatible result is returned (step 810) with the process terminating thereafter. With reference again to step 808, if the version is present within the list, then a compatible result is returned (step 812) with the process terminating thereafter. With reference again to step 804, if the version specified in the child class is the same as the parent version, then the process also proceeds to step 812 to return a compatible result.

Figures 9, 10:
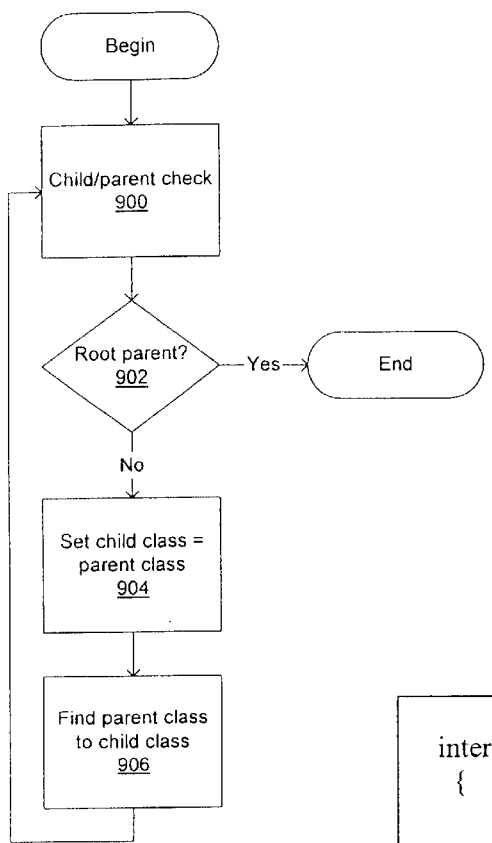
FIG. 9 is used to check compatibility of versions within the hierarchy of classes between various parent and child classes.
FIG. 10 is an example of a current interface definition used in SOM in accordance with a preferred embodiment of the present invention.

The process in FIG. 9 is used to check compatibility of versions within the hierarchy of classes between various parent and child classes. In particular, the process in FIG. 9 performs a recursive check of the parent class as a child class until a root parent class is reached. The process begins by performing a child and parent check (step 900). This check may be implemented using the steps illustrated in FIG. 8. A determination is then made as to whether the root parent has been reached (step 902). If the parent in the child and parent check is not the root parent, then the child class is set equal to the parent class (step 904). Then, the parent class to the child class is then identified (step 906) with the process then returning to step 900 for a child and parent check on versioning. With reference again to step 902, if the parent class is the root parent class, the process then terminates. The root parent class Us a class that has no parent.

Although the examples illustrated were those of a Java implementation, the method, apparatus, and instructions of the present invention may be applied to other types of environments, such as, for example System Object Model (SOM), which is a language-independent architecture from International Business Machines Corporation that implements the Common Object Request Broker Architecture (CORBA) standard. CORBA is a specification developed by the Object Management Group in 1992 in which pieces of programs (objects) communicate with other objects in other programs, even if the two programs are written in different programming languages and are running on different platforms.

In the implementation of SOMversion 2, versioning information is present, but does not apply to inheritance relationships nor does it convey backward compatibility information. Thus, the mechanism of the present invention may be implemented in SOM in a manner similar to that in Java. The check may begin when an instance of a class is created. The derived class will check the parent class or classes for version compatibility.

With reference now to FIG. 10, an example of a current interface definition used in SOM is depicted in accordance with a preferred embodiment of the present invention. A version mechanism containing an interface level along with a list of backward compatibility levels is maintained. Also, the interface version for the parent class is defined.

In this example, version 1000 identifies the current version of the implementation for a SOM object. Here, version 1000 is 5. if no version number is present, a version number of 0 is implied. Compatibleversion 1002 includes version numbers 3 and 4 in this example. Compatibleversion 1002 identifies previous versions of the implementation that are backward compatible from the current version identified in version 1000. If no compatible version is specified, then it is assumed that the interface has no compatible versions. Parentversion 1004 identifies the version of the parent class of the SOM object that is to be verified. If no parent version is specified in parentversion 1004, then the parent class will not be checked. As with the example illustrated in FIG. 9, the verification process starts with the lowest derivation and moves upward through the class hierarchy, verifying each parent.

Version 1006 provides the current version of the interface for the SOM object, while compatibleversion 1008 lists the versions with which the SOM object is backward compatible. Parentversion 1010 indicates the parent version or versions that are to be verified for the SOM object.

The SOM implementation described shows an alternative implementation of this same invention when applied to an object oriented system that has different capabilities. In the case of the parent version modifier, the parent class is identified along with the version. This difference allows multiple instances of the parent version modifier to be used, reflecting the multiple implementation inheritance feature of SOM.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to -he invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a computer for versioning a class with a parent class in an object oriented environment, the process comprising the computer implemented steps of:

identifying a version of the parent class of the class;

identifying a required version for the parent class;

comparing the version to the required version;

responsive to a lack of correspondence between the version and the required version, identifying versions compatible with the version of the parent class, wherein the versions are identified versions; and determining whether the identified versions correspond to the required version.

2. The method of claim 1, wherein identifying steps are initiated upon loading of the class.

3. The method of claim 1, wherein the class is a Java class.

4. A method in a computer for determining compatibility between a child class and a parent class for the child class, the process comprising the computer implemented steps of:

receiving a request to load a child class;

obtaining a child version identifier for the child class;

obtaining a parent version identifier for the parent class;

determining whether the parent version identifier matches the child version identifier;

responsive to a determination that a match between the parent version identifier and the child version identifier is absent, obtaining a plurality of version identifiers compatible with the parent version identifier; and responsive to obtaining the plurality of version identifiers, determining whether a match between the child version identifier and one of the plurality of version identifiers is present.

5. The method of claim 4, further comprising:

responsive to an absence of a match between the child version indent flyer and one of the plurality of version identifiers, generating an exception.

6. The method of claim 4, further comprising:

responsive to an absence of a match between the child version identifier and one of the plurality of version identifiers, preventing instantiation of the child class.

7. The method of claim 4, further comprising:

responsive to an absence of a match between the child version identifier and one of the plurality of version identifiers, completing instantiation of the child class.

8. The method of claim 4, wherein the child version identifier is an interface version number.

9. The method of claim 4, wherein the child version identifier is an implementation version number.

10. The method of claim 4, wherein the class is a Java class.

11. A method in a data processing system for identifying compatibility between a first object and a second object in an object-oriented environment, the method comprising the data processing system implemented steps of:

obtaining a first version number of the first object and compatible version numbers identifying versions compatible with the version number;

identifying a second version number identifying a version required for compatibility with the second object;

comparing the first version number with the second version number; and responsive to an absence of a match between the first version number and the second version number, determining whether a match is present between the second version number and one of the compatible version numbers.

12. The method of claim 11, wherein the first object and the second object are System Object Model Objects.

13. The method of claim 11, wherein the first object and the second object are Java objects.

14. A method in a computer for identifying compatibility between a child class and a parent class, wherein the child class and the parent class each have an interface and an implementation and wherein the child class has a version requirement for compatibility with the parent class, the method comprising the computer implemented steps of:

obtaining, from the parent class, an interface version identification and an implementation identification for the parent class;

comparing the version requirement of the child class with an interface version identification and an implementation identification for the parent class;

responsive to an absence of a match between the version requirement of the child class with the an interface version identification and the implementation identification for the parent class, obtaining, from the parent class, an identification of interface versions and implementation versions compatible with the interface version identification and an implementation identification for the parent class; and determining whether the version requirement matches the interface versions and implementation versions compatible with the an interface version identification and an implementation identification for the parent class.

15. A class data structure for use in an object oriented environment comprising:

a plurality of class declarations, each comprising;
a first field which identifies a required parent class version;
a second field which identifies a current version for the class; and
a third field which identifies versions to which the current version is backward compatible;
wherein, a positive comparison between said second field of a child class and either of said first field of a parent class or said third field of said parent class indicates that said child class and said parent class can be used together with compatibility.

16. A data processing system in a computer for versioning a class with a parent class in an object oriented environment, the data processing system comprising:

first identifying means for identifying a version of the parent class of the class;

second identifying means for identifying a required version for the parent class;

comparing means for comparing the version to the required version;

third identifying means, responsive to a lack of correspondence between the version and the required version, for identifying versions compatible with the version of the parent class, wherein the versions are identified versions; and determining means for determining whether the identified versions correspond to the required version.

17. The data processing system of claim 16, wherein identifying steps are initiated upon loading of the class.

18. The data processing system of claim 16, wherein the class is a Java class.

19. A data processing system in a computer for determining compatibility between a child class and a parent class for the child class, the data processing system comprising:

receiving means for receiving a request to load a child class;

first obtaining means for obtaining a child version identifier for the child class;

second obtaining means for obtaining a parent version identifier for the parent class;

first determining means for determining whether the parent version identifier matches the child version identifier;

third obtaining means, responsive to a determination that a match between the parent version identifier and the child version identifier is absent, for obtaining a plurality of version identifiers compatible with the parent version identifier; and second determining means, responsive to obtaining the plurality of version identifiers, for determining whether a match between the child version identifier and one of the plurality of version identifiers is present.

20. The data processing system of claim 19, further comprising:

generating means, responsive to an absence of a match between the child version identifier and one of the plurality of version identifiers, for generating an exception.

21. The data processing system of claim 19, further comprising:

preventing means, responsive to an absence of a match between the child version identifier and one of the plurality of version identifiers, for preventing instantiation of the child class.

22. The data processing system of claim 19, further comprising:

completing means, responsive to an absence of a match between the child version identifier and one of the plurality of version identifiers, for completing instantiation of the child class.

23. The data processing system of claim 19, wherein the child version identifier is an interface version number.

24. The data processing system of claim 19, wherein the child version identifier is an implementation version number.

25. The data processing system of claim 19, wherein the class is a Java class.

26. A data processing system for identifying compatibility between a first object and a second object in an object-oriented environment, the data processing system comprising:

obtaining means for obtaining a first version number of the first object and compatible versions numbers identifying versions compatible with the version number;

identifying means for identifying a second version number identifying a version required for compatibility with the second object;

comparing means for comparing the first version number with the second version number; and determining means, responsive to an absence of a match between the first version number and the second version number, for determining whether a match is present between the second version number of one of the compatible version numbers.

27. The data processing system of claim 26, wherein the first object and the second object are System Object Model Objects.

28. The data processing system of claim 26, wherein the first object and the second object are Java objects.

29. A data processing system in computer for identifying compatibility between a child class and a parent class, wherein the child class and the parent class each have an interface and an implementation and wherein the child class has a version requirement for compatibility with the parent class, the data processing system comprising:

first obtaining means for obtaining, from the parent class, an interface version identification and an implementation identification for the parent class;

comparing means for comparing the version requirement of the child class with the an interface version identification and an implementation identification for the parent class;

second obtaining means, responsive to an absence of a match between the version requirement of the child class with the an interface version identification and an implementation identification for the parent class, for obtaining, from the parent class, an identification of interface versions and implementation versions compatible with the an interface version identification and an implementation identification for the parent class; and determining means for determining whether the version requirement matches the interface versions and implementation versions compatible with the an interface version identification and an implementation identification for the parent class.

30. A computer program product in a computer readable medium for versioning a class with a parent class in an object oriented environment, the computer program product comprising:

first instructions for identifying a version of the parent class of the class;

second instructions for identifying a required version for the parent class;

third instructions for comparing the version to the required version;

fourth instructions, responsive to a lack of correspondence between the version and the required version, for identifying versions compatible with the version of the parent class, wherein the versions are identified versions; and fifth instructions for determining whether the identified versions correspond to the required version.

31. A computer program product in a computer readable medium for determining compatibility between a child class and a parent class for the child class, the computer program product comprising:

first instructions for receiving a request to load a child class;

second instructions for obtaining a child version identifier for the child class;

third instructions for obtaining a parent version identifier for the parent class;

fourth instructions for determining whether the parent version identifier matches the child version identifier;

fifth instructions, responsive to a determination that a match between the parent version identifier and the child version Identifier is absent, for obtaining a plurality of version identifiers compatible with the parent version identifier; and sixth instructions, responsive to obtaining the plurality of version identifiers, for determining whether a match between the child version identifier and one of the plurality of version identifiers is present.

32. A computer program product in a computer readable medium for identifying compatibility between a first object and a second object in an object-oriented environment, the computer program product comprising:

first instructions for obtaining a first version number of the first object and compatible versions numbers identifying versions compatible with the version number;

second instructions for identifying a second version number identifying a version required for compatibility with the second object;

third instructions for comparing the first version number with the second version number; and fourth instructions, responsive to an absence of a match between the first version number and the second version number, for determining whether a match is present between the second version number and one of the compatible version numbers.

33. A computer program product in a computer readable medium for identifying compatibility between a child class and a parent class, wherein the child class and the parent class each have an interface and an implementation and wherein the child class has a version requirement for compatibility with the parent class, the computer program product comprising:

first instructions for obtaining, from the parent class, an interface version identification and an implementation identification for the parent class;

second instructions for comparing the version requirement of the child class with the an interface version identification and an implementation identification for the parent class;

third instructions, responsive to an absence of a match between the version requirement of the child class with the an Interface version identification and an implementation identification for the parent class, for obtaining, from the parent class, an identification of interface versions and implementation versions compatible with the an interface version identification and an implementation identification for the parent class; and fourth instructions for determining whether the version requirement matches the interface versions and implementation versions compatible with the an interface version identification and an implementation identification for the parent class.

34. A method in a computer for determining compatibility between a class and its parent class in an object oriented environment, the method comprising the steps of:

storing, in a declaration for each class,
a first field which identifies a version of the class,
a second field which identifies a version of the parent class which is necessary for compatibility with said class, and
a third field which contains a list of versions with which the version of the parent class is backward compatible, and when a compatibility check between a child class and a respective parent class is requested, returning a value corresponding to compatible if said second field of said child declaration is the same as either said first field of said parent declaration or one of said list of versions of said third field of said parent declaration, otherwise returning a value corresponding to not compatible.

35. The method of claim 34, wherein said classes are Java classes.

36. The method of claim 34, wherein a new instance of a child class cannot be instantiated without a match with its parent class.

37. A data processing system in a computer for determining compatibility between a child class and a parent class in an object oriented environment, the data processing system comprising:

receiving means for receiving a request to load the child class;

first obtaining means for obtaining, from a declaration of said child class, a child version-identifier which identifies a parent version necessary for compatibility;

second obtaining means for obtaining, from a declaration of said parent class, a parent version-identifier which identifies a current version of said parent class;

first determining means for determining whether said parent version-identifier matches said child version-identifier;

third obtaining means for obtaining, from said declaration of said parent class, a compatible version-identifier which identifies a plurality of parent versions with which said current version of said parent class are backward compatible; and second determining means, responsive to obtaining said compatible version-identifier, for determining whether said child version-identifier matches one of said plurality of parent versions in said compatible version-identifier;

wherein, a compatible match is acknowledged when either said first determining means or said second determining means returns a match.

38. The data processing system of claim 37, wherein said third obtaining means and said second determining means are not activated unless said first determining means returns a finding of no match.

39. The data processing system of claim 37, wherein said child version-identifier, said parent version-identifier, and said compatible version-identifier all contain interface version numbers.

40. The data processing system of claim 37, wherein said child version-identifier, said parent version-identifier, and said compatible version-identifier all contain implementation version numbers.

* * * * *

UNITED STATES PATENT AND TRADEMARK OFFICE
CERTIFICATE OF CORRECTION

PATENT NO.   : 6,415,435 B1
DATED        : July 2, 2002
INVENTOR(S)  : McIntyre

It is certified that error appears in the above-identified patent and that said Letters Patent is hereby corrected as shown below:

Column 2,
Line 15, after "FIG. 4", please delete "an" and insert -- is an --.

Column 10,
Line 16, after "version", please delete "indent flyer" and insert -- identifier --.

Column 13,
Line 41, after "version", please delete "Identifier" and insert -- identifier --.

Column 14,
Line 17, after "an", please delete "Interface" and insert -- interface --.

Signed and Sealed this

Twentieth Day of May, 2003

JAMES E. ROGAN
*Director of the United States Patent and Trademark Office*